United States Patent [19]

Van Vuuren

[11] Patent Number: 5,098,345

[45] Date of Patent: Mar. 24, 1992

[54] CONTINUOUSLY VARIABLE TRANSMISSION

[75] Inventor: Sebastiaan W. M. Van Vuuren, Breda, Netherlands

[73] Assignee: Van Doorne's Transmissie B.V., Tilburg, Netherlands

[21] Appl. No.: 642,247

[22] Filed: Jan. 4, 1991

[30] Foreign Application Priority Data

Mar. 15, 1990 [NL] Netherlands ............... 9000589

[51] Int. Cl.⁵ ............................................. F16H 59/00
[52] U.S. Cl. ................................. 474/8; 192/0.076
[58] Field of Search ............ 474/8, 11, 12, 18, 28, 474/69, 70, 17; 192/0.075, 0.076

[56] References Cited

U.S. PATENT DOCUMENTS

| | | | |
|---|---|---|---|
| 4,541,821 | 9/1985 | Sakakibara | 474/11 X |
| 4,543,852 | 10/1985 | Svab et al. | 74/695 |
| 4,601,681 | 7/1986 | Costelli et al. | 474/11 X |
| 4,606,446 | 8/1986 | Watanabe | 192/0.076 |
| 4,909,776 | 3/1990 | Sakakibara et al. | 474/11 X |

FOREIGN PATENT DOCUMENTS

| | | | |
|---|---|---|---|
| 0057807 | 8/1982 | European Pat. Off. | 43/21 |
| 0109001 | 5/1984 | European Pat. Off. | 37/02 |

*Primary Examiner*—Thuy M. Bui
*Attorney, Agent, or Firm*—Pennie & Edmonds

[57] ABSTRACT

A continuously variable transmission including at least a primary pulley fixed to a primary shaft, a secondary pulley fixed to a secondary shaft and an endless transmission element located between the primary and secondary pulleys. A slip preventor is included to control and/or prevent slip of the endless transmission element with respect to the pulleys. A clutch and incorporated to the slip preventor in order to allow the amount slip to be adjusted based on factors such as the torque transmitted by the transmission.

19 Claims, 1 Drawing Sheet

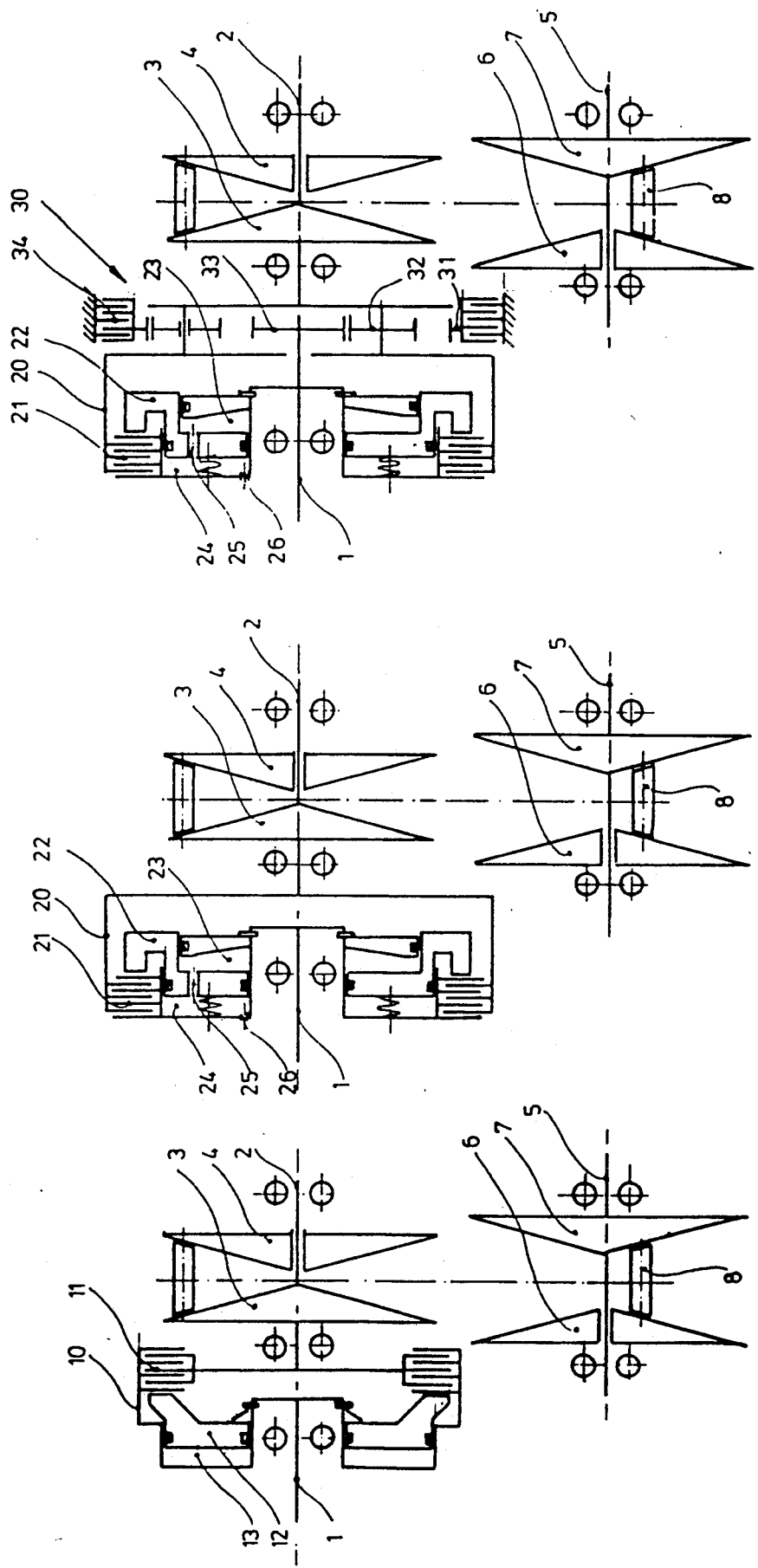

CONTINUOUSLY VARIABLE TRANSMISSION

BACKGROUND OF THE INVENTION

The invention relates to a continuously variable transmission at least comprising a primary pulley fixed to a primary shaft, a secondary pulley fixed to a secondary shaft and an endless transmission element located between the primary and the secondary pulleys.

Such a continuously variable transmission is known and for instance described in the European patent 109001. A disadvantage of this known transmission is that the endless transmission element can slip between the pulleys when the torques to be transmitted, for instance transmission shocks, become too large. This slip is undesirable in view of wear and economy. The slip can to some extent be met by increasing the pinching force of one or both pulleys on the endless transmission element. An increase of the pinching force however has a disadvantageous effect on the efficiency of the transmission.

SUMMARY OF THE INVENTION

It is an object of the present invention to meet the said disadvantages and to this end provides a continuously variable transmission which is characterized by the fact that the transmission is provided with slip preventing means to prevent the through slip of the endless transmission element between the pulleys.

By the use of the slip prevention means slip of the endless transmission element does not take place and as a consequence wear of the endless transmission element and of the pulley is prevented. Also the pinching force of the pulleys on the endless transmission element can be decreased whereby the efficiency of the transmission is increased.

The slip prevention means according to the invention are preferably so arranged that the maximum torque to be passed by the slip prevention means is smaller than the torque which would cause slip of the transmission element.

The slip prevention means can to this end be provided with slip elements which start to slip at a lower torque than that of the endless transmission element. In this case slip also occurs but not at an undesirable place and not in an uncontrollable way. Preferably the slip means are controllable so that dependent on the circumstances, for instance dependent on the torque to be transmitted, the magnitude of the slip can be adjusted. To prevent the influence of a centrifugal action the slip prevention means preferably also are provided with centrifugal compensation means.

According to a further development of the invention the slip prevention means also include a clutch which advantageously is a part of the forward coupling of a clutch which usually is present in a forward/rearward-/neutral clutch unit. The magnitude of the slip is in that case preferably adjustable for instance by means of a fluid pressure in dependance of the circumstances such as the torque to be transmitted.

BRIEF DESCRIPTION OF THE DRAWINGS

The invention will be explained in more detail by some examples of different embodiments in connection with a drawing. The drawing shows in:

FIG. 1 schematically a continuously variable transmission provided with slip prevention means including an adjustable clutch;

FIG. 2 schematically a continuously variable transmission provided with slip prevention means including a clutch together with centrifugal compensation means; and FIG. 3 the continuously variable transmission according to FIG. 2 wherein the clutch is part of a forward/rearward/neutral unit.

DETAILED DESCRIPTION OF THE PREFERRED EMBODIMENTS

In FIGS. 1, 2 and 3 schematically a continuously variable transmission is represented provided with an ingoing shaft 1 which is for instance driven by an internal combustion engine. The ingoing shaft 1 drives a primary shaft 2 bearing a primary pulley consisting of a coaxially displaceable disc 4 and a stationary disc 3. A secondary shaft 5 bears a secondary pulley including a coaxially displaceable disc 6 and a stationary disc 7. Between the primary (3, 4) and the secondary (6, 7) pulley an endless transmission element (8) is provided. In a manner which is known in itself the transmission ratio of the transmission can be continuously adjusted by moving the axially displaceable pulley discs 4, 6 which results in an adjustment of the radial position of the endless transmission element.

When too large torques are to be transmitted there is a possibility that the friction forces between the primary and the secondary pulley on one side and the endless transmission element on the other side are insufficient to transmit these torques. As a consequence the endless transmission element slips between the pulleys. This is undesirable in view of the wear which ensures. It is possible to increase the friction between the pulleys and the endless transmission element 8 by increasing the pinching force on the endless transmission element in one or both pulleys. From the point of efficiency considerations this however is undesirable. When for instance the pinching force is hydraulically transmitted to the pulleys as described in EP-A-109001 such an increase of the pinching force requires a larger pump having a larger flow and/or a higher pressure which influences the efficiency of the transmission in a disadvantageous way. A larger pump is moreover expensive and requires more space for building in.

In FIG. 1 the continuously variable transmission is provided with slip preventing means with adjustable slip elements in the form of a controllable clutch 10. The clutch is provided with blades 11 which may be compressed by a plunger 12 to a greater or lesser extent in order to transmit a larger or smaller torque from the ingoing shaft 1 to the secondary shaft 2 by the friction contact there between. The fluid pressure in cylinder 13 is thereby adjusted such that the plunger 12 compresses the blades 11 of the clutch 10 to such an extent that the maximum torque to be transmitted by clutch 10 is always smaller and preferably just smaller than the torque where the endless transmission element 8 would in these cases slip in the pulleys. The clutch has to this end such a construction that under all circumstances the clutch 10 will slip at an earlier moment than the endless transmission element 8. It is true that then the slip occurs at the blades 11 but this is acceptable because generally the blades 11 and the clutch 10 can be adapted thereto. The pinching force of the pulleys on the endless transmission element need moreover not to be overdimensioned because the slip prevention means take over the safety function thereof. In general the efficiency of the transmission is greatly improved.

As in the cylinder 13 apart from the static pressure a pressure build-up takes place by the centrifugal action of the fluid in the rotating cylinder 13 the pressure adjustment and the slip prevention connected therewith will be improved but is not yet at its optimum. In the embodiment of the invention according to FIG. 2 this centrifugal action is avoided resulting in an optimal pressure adjustment and connected therewith an optimal slip prevention.

The continuously variable transmission according to FIG. 2 again has a clutch 20 comprising blades 21, a piston 22 and a cylinder 23. The centrifugal pressure in cylinder 23 however is now compensated by a compensation chamber 24 on the side of the piston 22 facing the cylinder 23. The chamber 24 is in this case supplied with the fluid through orifice 25 in the piston 22. Fluid from the chamber 24 flows off through the opening 26. In view of the fact that the fluid in the chambers 24 rotates with the same speed as in cylinder 23 the pressure builds-up through the centrifugal action on both sides of the piston 22 are of the same magnitude and thus compensate eachother. The value of the compression by the piston 22 of the blades 21 is thereby explicitly determined by the adjusted static pressure in the cylinder 23. The slip of the clutch is thereby optimally adjusted and also the slip prevention of the endless transmission element is at an optimum. As the case may be the orifice 25 in the piston 22 may be provided with a filter, a sieve or other means to prevent clogging of the element 25 by deposit of impurities present in the fluid.

Continuously variable transmissions which are used in vehicles also comprise in many cases a clutch unit for forward/rearward/neutral, enabling the vehicle to be given at will a forward or rearward direction or to be kept in a neutral position. FIG. 3 shows such a forward/rearward/neutral clutch unit in the form of a planetary gearset 30 comprising a ringwheel 31, planetwheels 32 and a sun wheel 33, a rearward clutch 34 and a forward clutch 20. The clutch 20 according to FIG. 2 is thereby integrated as a forward clutch 20 with the forward/rearward/neutral clutch unit of the transmission.

Although the slip prevention means in the embodiments according to FIGS. 1-3 are located in front of the primary pulley they can according to the invention without objection also be placed behind the secondary pulley, seen in the direction of driving, because the increased torques, for instance caused by coupling shocks from the engine or from the road can be absorbed independently of the inposition without the transmission element 8 being caused.

It will be apparent that the invention is not limited to the embodiments shown but that within the scope of the invention many alternatives are possible and are thus considered to be within the scope of the invention. So for instance in case the transmission is provided with a torque converter the bridging clutch of the lock-up means of said torque converter may be integrated in the slip preventing means.

The lock-up can for instance be controlled in a pulsating way such that a controlled continuous slip will occur. As the lock-up (or the bridging clutch) slips continuously the lock-up will slip still more by a coupling shock but slip of the endless transmission element between the pulleys will be prevented.

I claim:

1. Continuously variable transmission at least provided with a primary pulley fixed to a primary shaft, a secondary pulley fixed to a secondary shaft and an endless transmission element located between the primary and secondary pulleys, characterized in that the transmission is provided with mechanical friction slip preventing means to prevent slip of the endless transmission element between the pulleys.

2. Continuously variable transmission according to claim 1, characterized in that the slip prevention means include a clutch.

3. Continuously variable transmission according to claim 2 characterized in that the clutch is adjustable.

4. Continuously variable transmission according to claim 3, characterized in that the clutch is adjustable by means of a fluid.

5. Continuously variable transmission according to claim 4 characterized in that the clutch is adjustable by means of a shiftable piston unit located in a cylinder.

6. Continuously variable transmission according to claim 5 characterized in that additionally a compensation chamber is provided to compensate the centrifugal pressure acting on the piston.

7. Continuously variable transmission according to claim 6 characterized in that the compensation chamber is supplied with a fluid by means of an orifice located in the piston.

8. Continuously variable transmission according to claim 7 characterized in that the orifice in the piston is provided with means to prevent clogging of said orifice.

9. Continuously variable transmission according to claim 2 characterized in that the clutch is the forward clutch of a coupling unit for forward/rearward/neutral.

10. Continuously variable transmission according to claim 2 characterized in that the clutch is a friction clutch.

11. Continuously variable transmission according to claim 1, characterized in that the slip preventing means are arranged such that in all circumstances the maximum torque to be transmitted through the slip preventing means in those cases is smaller than the slip torque of the endless transmission element under the same conditions.

12. Continuously variable transmission according to claim 11, characterized in that the slip preventing means are provided with slip elements.

13. Continuously variable transmission according to claim 12, characterized in that the slip means are adjustable.

14. Continuously variable transmission according to claim 13, characterized in that a centrifugal compensation is provided.

15. Continuously variable transmission according to claim 14 characterized in that the slip prevention means are located in front of the primary pulley seen in the direction of driving.

16. Continuously variable transmission according to claim 14 characterized in that the slip prevention means are located behind the secondary pulley seen in the direction of driving.

17. A continuously variable transmission, comprising:
a primary pulley fixed to a primary shaft;
a secondary pulley fixed to a secondary shaft;
an endless transmission element located between the primary and secondary pulleys; and
means for preventing slip of the endless transmission element on said pulleys comprising a clutch having meshing blades, whereby pressure exerted on said blades controls the slip of said endless transmission element.

18. A continuously variable transmission, comprising:

a primary pulley fixed to a primary shaft;
a secondary pulley fixed to a secondary shaft;
an endless transmission element located between the primary pulley and secondary pulleys; and
an ingoing shaft transmitting torque to the primary shaft through a clutch; wherein said clutch includes first blades fixed for rotation with the ingoing shaft and second blades fixed for rotation with the primary shaft, said blades being meshed, and fluid actuated plunger means for exerting pressure on said blades to produce friction therebetween and control the torque transmitted from the ingoing shaft to the primary shaft by the friction produced.

19. A continuously variable transmission according to claim 18, further comprising:
cylinder means for actuating said plunger means, said cylinder means fixed for rotation with the ingoing shaft and first blades;
means defining a compensation chamber capable of receiving said plunger means, said compensation chamber also fixed for rotation with the ingoing shaft and first blades; and
means defining a fluid passage through said plunger means for fluid communication between said cylinder means and said chamber, whereby centrifugal force effects on said plunger are compensated and equalized.

* * * * *